US012627601B2

(12) United States Patent
Zacks et al.

(10) Patent No.: US 12,627,601 B2
(45) Date of Patent: May 12, 2026

(54) PHYSICAL LAYER METADATA CARRIER FOR ETHERNET SYSTEMS

(71) Applicant: Cisco Technology, Inc., San Jose, CA (US)

(72) Inventors: David John Zacks, Vancouver (CA); Thomas Szigeti, Vancouver (CA); Barry Qi Yuan, Vancouver (CA); Robert Edgar Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 328 days.

(21) Appl. No.: 18/206,775

(22) Filed: Jun. 7, 2023

(65) Prior Publication Data

US 2024/0414083 A1 Dec. 12, 2024

(51) Int. Cl.
| | |
|---|---|
| *H04L 12/66* | (2006.01) |
| *H04L 45/00* | (2022.01) |
| *H04L 45/74* | (2022.01) |
| *H04L 69/22* | (2022.01) |
| *H04L 69/324* | (2022.01) |

(52) U.S. Cl.
CPC ............ *H04L 45/566* (2013.01); *H04L 45/74* (2013.01); *H04L 69/22* (2013.01); *H04L 69/324* (2013.01)

(58) Field of Classification Search
CPC ..... H04L 47/10; H04L 49/351; H04L 12/403; H04L 1/08; H04L 12/40136; H04L 1/1887; H04L 2001/125; H04L 49/25; H04L 49/3009; H04L 7/041; H04L 45/00; H04L 69/22; H04L 7/10; H04L 27/2657; H04M 11/06; H04M 7/006; H04M 11/00;

H04Q 2213/13196; H04Q 2213/13216; H04Q 2213/13296; H04J 3/0697; H04J 3/065; H04J 4/00; H04J 3/0638; H04J 2203/0085; H04J 3/0605; H04J 3/0632; H04J 3/06

See application file for complete search history.

(56) References Cited

U.S. PATENT DOCUMENTS

| | | | |
|---|---|---|---|
| 8,705,524 B1 | 4/2014 | Kelly et al. | |
| 2008/0075002 A1* | 3/2008 | Fourcand | ............ H04L 47/2441 |
| | | | 370/230 |
| 2009/0154492 A1* | 6/2009 | Diab | ...................... H04L 47/10 |
| | | | 370/465 |
| 2010/0074260 A1 | 3/2010 | Gross et al. | |
| 2014/0245114 A1 | 8/2014 | Thaler et al. | |
| 2018/0048499 A1* | 2/2018 | de Ruijter | ........... H04L 27/2017 |

(Continued)

OTHER PUBLICATIONS

Lurman, Justin, "Master Thesis: Fast Service Chaining," ULG Library, http://lib.ulg.ac.be, 60 pages.

*Primary Examiner* — Kharye Pope
(74) *Attorney, Agent, or Firm* — Lee & Hayes, P.C.

(57) ABSTRACT

Techniques for, among other things, embedding metadata in network traffic without having to implement an overlay network. By way of example, and not limitation, the techniques described herein may include receiving an Ethernet packet at a network node and determining that a preamble of the Ethernet packet includes metadata. The metadata may, in some examples, be associated with the Ethernet packet itself, a flow that the Ethernet packet belongs to, etc. Based at least in part on the metadata, a policy decision may be made for handling the Ethernet packet, and the Ethernet packet may be handled in accordance with the policy decision.

20 Claims, 7 Drawing Sheets

(56) References Cited

U.S. PATENT DOCUMENTS

| | | | | |
|---|---|---|---|---|
| 2018/0359329 A1* | 12/2018 | Vacaro | .................... | H04L 69/22 |
| 2020/0274818 A1* | 8/2020 | Hu | ...................... | H04L 47/2441 |
| 2021/0400125 A1 | 12/2021 | Melton | | |

* cited by examiner

FIG. 1

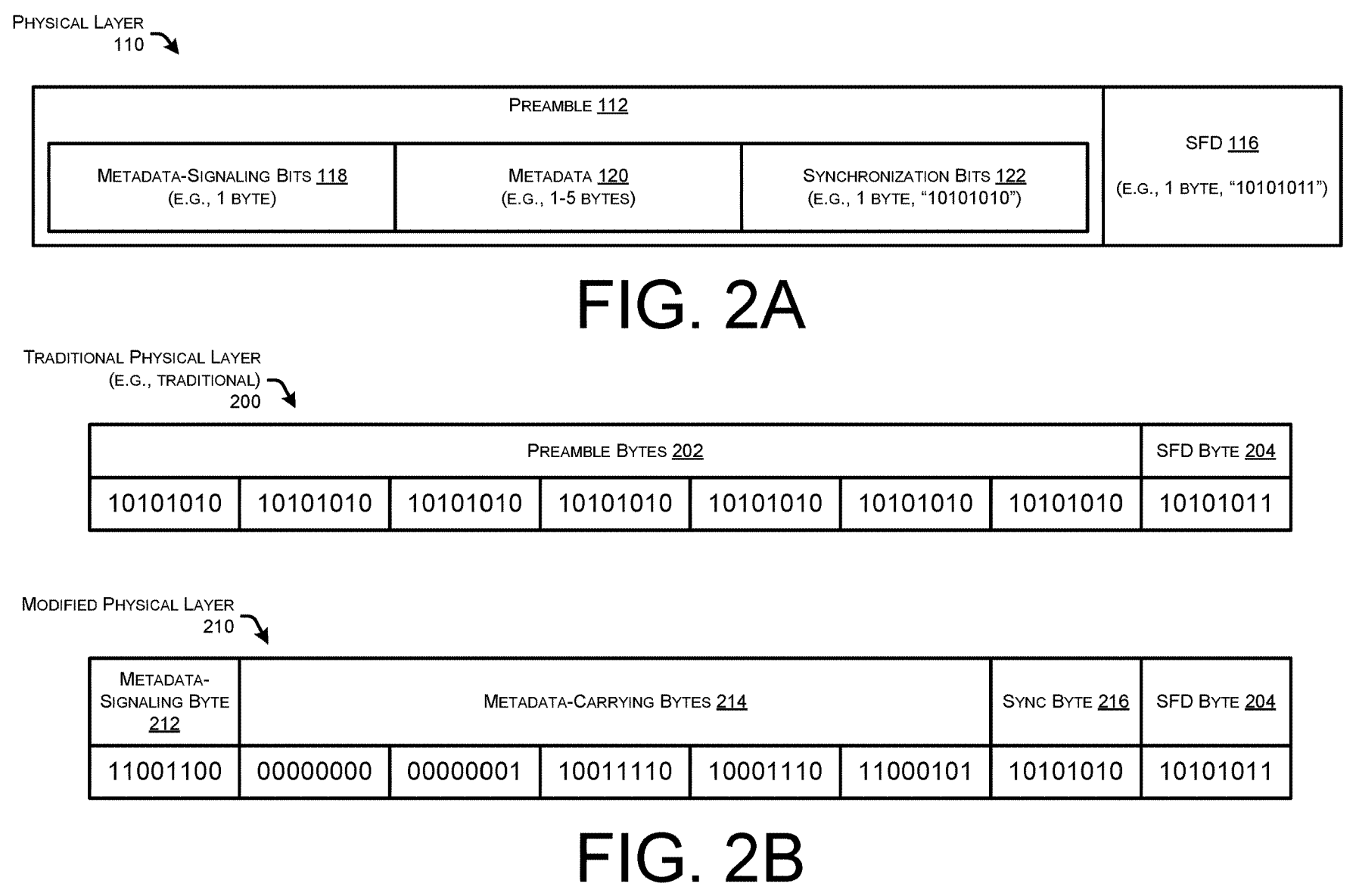

PHYSICAL LAYER 110

| PREAMBLE 112 | | SFD 116 |
|---|---|---|
| METADATA-SIGNALING BITS 118 (E.G., 1 BYTE) | METADATA 120 (E.G., 1-5 BYTES) | SYNCHRONIZATION BITS 122 (E.G., 1 BYTE, "10101010") | (E.G., 1 BYTE, "10101011") |

FIG. 2A

TRADITIONAL PHYSICAL LAYER (E.G., TRADITIONAL) 200

| PREAMBLE BYTES 202 | | | | | SFD BYTE 204 |
|---|---|---|---|---|---|
| 10101010 | 10101010 | 10101010 | 10101010 | 10101010 | 10101011 |

FIG. 2B

MODIFIED PHYSICAL LAYER 210

| METADATA-SIGNALING BYTE 212 | METADATA-CARRYING BYTES 214 | | | | SYNC BYTE 216 | SFD BYTE 204 |
|---|---|---|---|---|---|---|
| 11001100 | 00000000 | 00000001 | 10011110 | 10001110 | 11000101 | 10101010 | 10101011 |

300 ↘

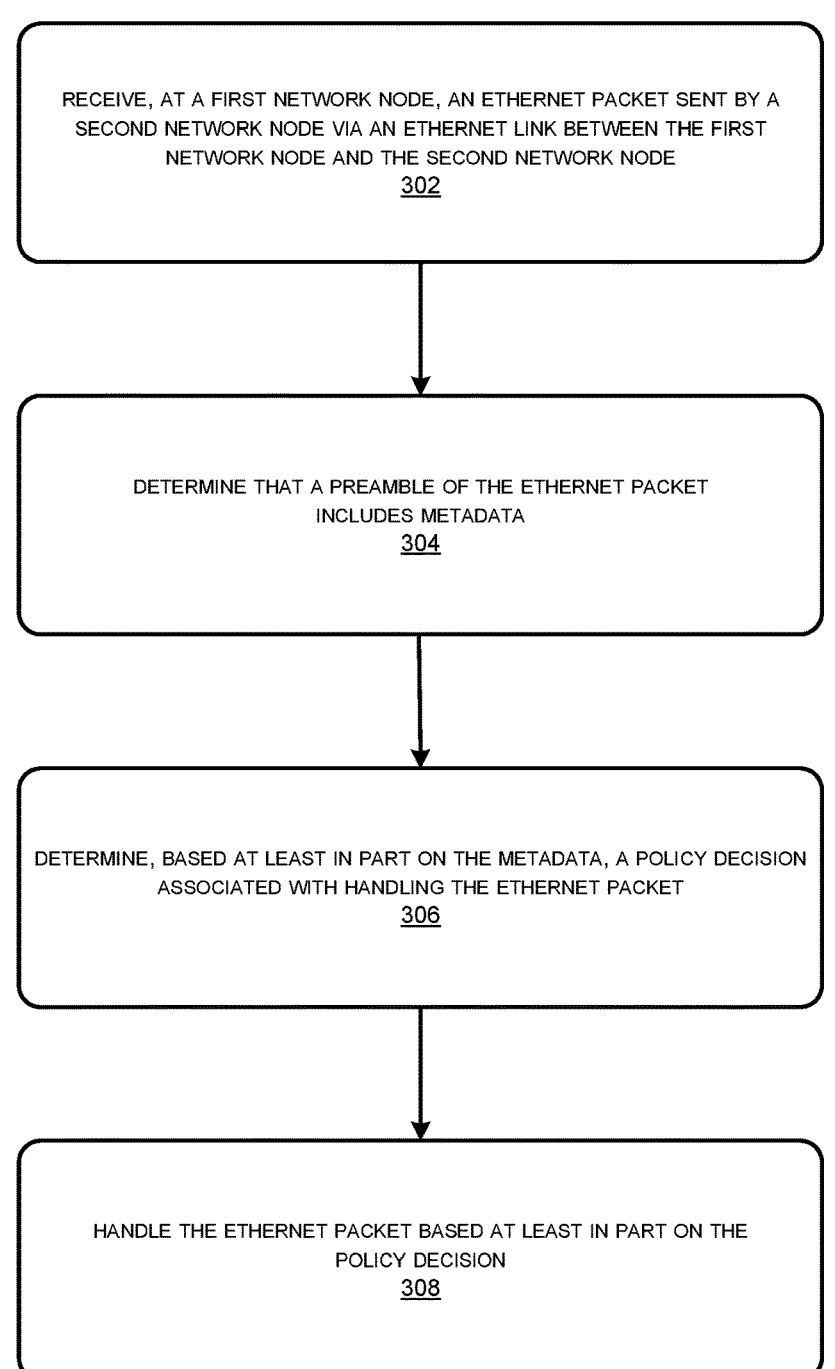

RECEIVE, AT A FIRST NETWORK NODE, AN ETHERNET PACKET SENT BY A
SECOND NETWORK NODE VIA AN ETHERNET LINK BETWEEN THE FIRST
NETWORK NODE AND THE SECOND NETWORK NODE
302

DETERMINE THAT A PREAMBLE OF THE ETHERNET PACKET
INCLUDES METADATA
304

DETERMINE, BASED AT LEAST IN PART ON THE METADATA, A POLICY DECISION
ASSOCIATED WITH HANDLING THE ETHERNET PACKET
306

HANDLE THE ETHERNET PACKET BASED AT LEAST IN PART ON THE
POLICY DECISION
308

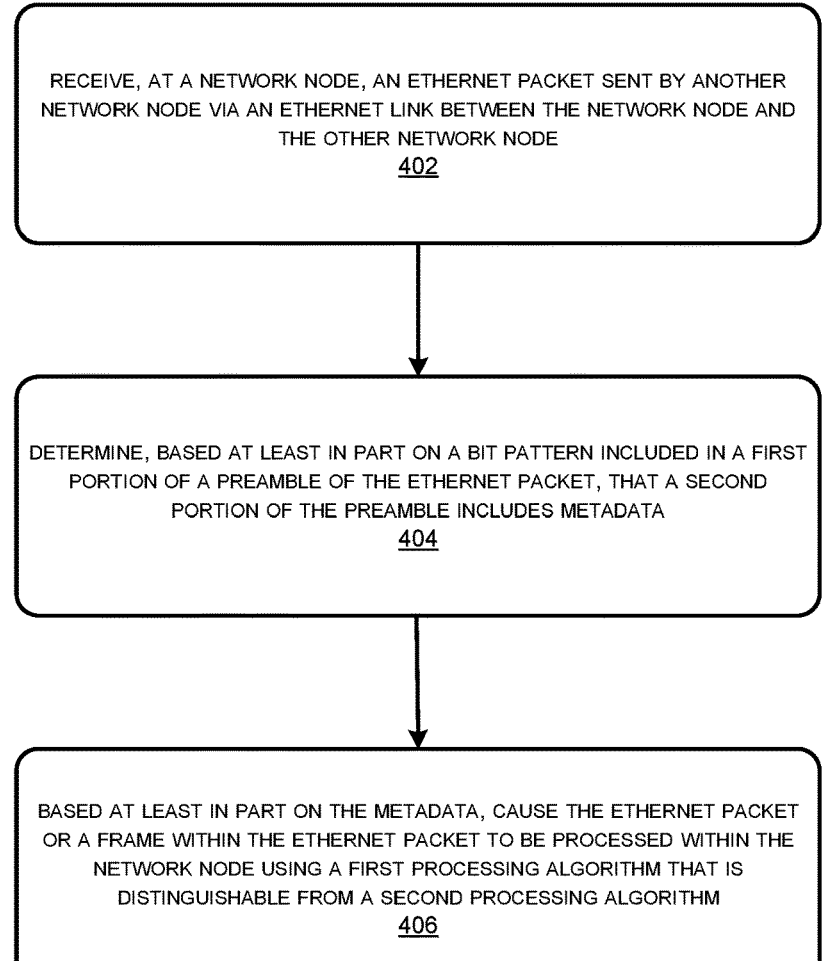

RECEIVE, AT A NETWORK NODE, AN ETHERNET PACKET SENT BY ANOTHER NETWORK NODE VIA AN ETHERNET LINK BETWEEN THE NETWORK NODE AND THE OTHER NETWORK NODE
402

DETERMINE, BASED AT LEAST IN PART ON A BIT PATTERN INCLUDED IN A FIRST PORTION OF A PREAMBLE OF THE ETHERNET PACKET, THAT A SECOND PORTION OF THE PREAMBLE INCLUDES METADATA
404

BASED AT LEAST IN PART ON THE METADATA, CAUSE THE ETHERNET PACKET OR A FRAME WITHIN THE ETHERNET PACKET TO BE PROCESSED WITHIN THE NETWORK NODE USING A FIRST PROCESSING ALGORITHM THAT IS DISTINGUISHABLE FROM A SECOND PROCESSING ALGORITHM
406

FIG. 4

PHYSICAL LAYER METADATA CARRIER FOR ETHERNET SYSTEMS

TECHNICAL FIELD

The present disclosure relates generally to techniques for, among other things, embedding metadata in network traffic without having to implement an overlay network.

BACKGROUND

A standard Internet Protocol version 4 (IPv4) packet lacks any place within the header to embed metadata concerning the packet itself or the end-to-end flow that the packet is part of. For instance, simple extension headers can be utilized in Internet Protocol version 6 (IPv6) to carry such metadata, but these technologies are not available for IPV4. Instead, passing metadata information in IPv4 from node to node within a network along a flow path requires the use of an overlay network, using technologies such as Virtual Extensible LAN (VXLAN), Multiprotocol Label Switching (MPLS), Virtual Private Networking (VPN), or similar technologies that allow for an extension of the IP packet header, thus providing a location where such metadata can be embedded. While functional, the implementation of such technologies on a large scale can oftentimes be impractical. Unfortunately, in some scenarios, lacking metadata restricts a node's ability to handle traffic in more sophisticated ways.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1 illustrates a portion of an example architecture in which various aspects of the techniques disclosed herein may be performed to embed metadata within an Ethernet packet.

FIG. 2A is a block diagram illustrating example detail of a portion of an Ethernet packet that is modified to carry metadata according to the technologies disclosed herein.

FIG. 2B illustrates a comparison between a traditional, layer-1 Ethernet packet and a modified layer-1 Ethernet packet for carrying metadata according to the technologies disclosed herein.

FIG. 3 is a flow diagram illustrating an example method associated with the techniques described herein.

FIG. 4 is a flow diagram illustrating an example method associated with the techniques described herein.

DESCRIPTION OF EXAMPLE EMBODIMENTS

Overview

Figure 5:
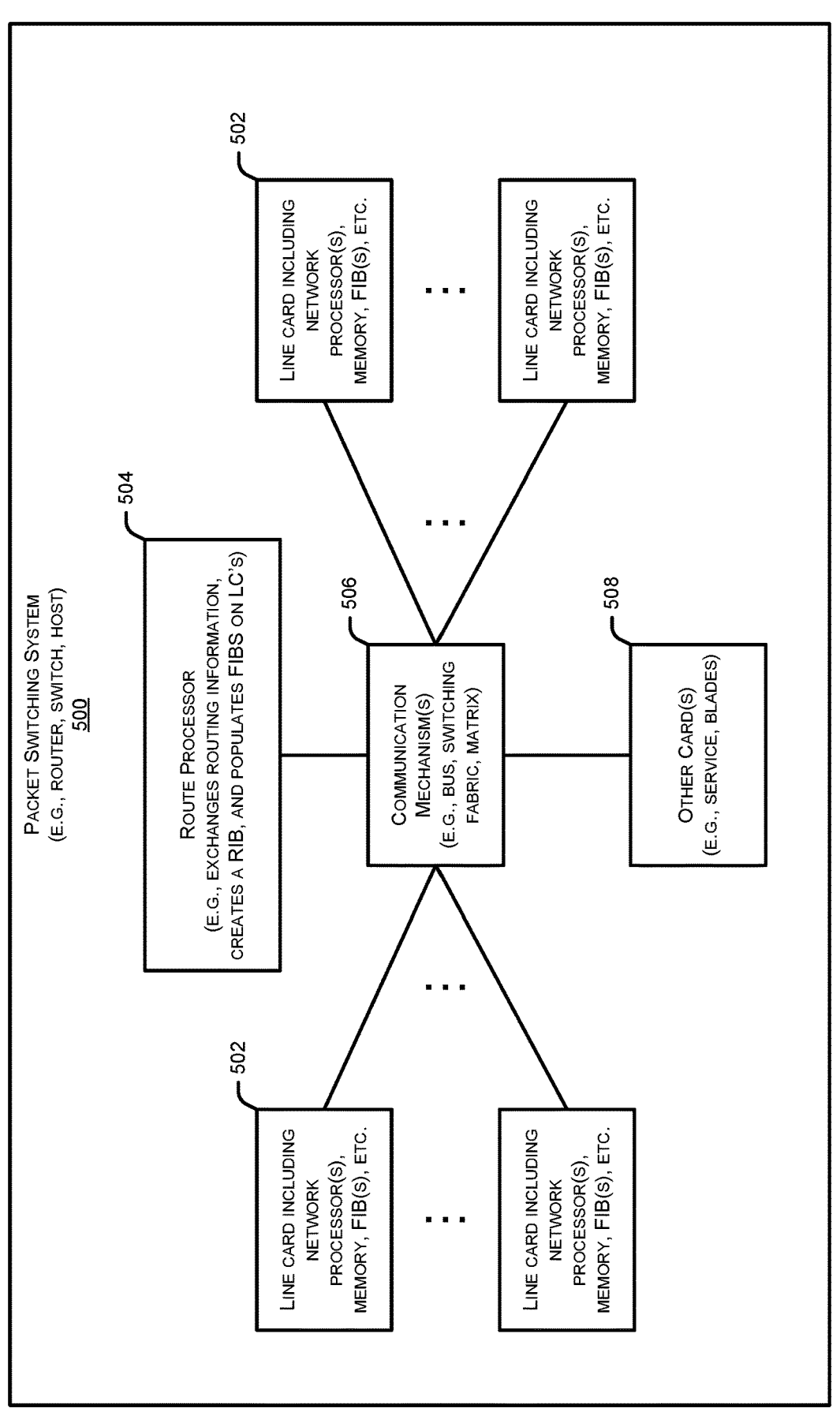
FIG. 5 is a block diagram illustrating an example packet switching system that can be utilized to implement various aspects of the technologies disclosed herein.

This disclosure describes various technologies for, among other things, embedding metadata in network traffic without having to implement an overlay network. By way of example, and not limitation, the techniques described herein may include receiving an Ethernet packet at a network node and determining that a preamble of the Ethernet packet includes metadata. Based at least in part on the metadata, a policy decision may be made for handling the Ethernet packet and the Ethernet packet may be handled in accordance with the policy decision.

Additionally, the techniques described herein may be performed as a method and/or by a system having non-transitory computer-readable media storing computer-executable instructions that, when executed by one or more processors, performs the techniques described above and herein.

EXAMPLE EMBODIMENTS

As noted above, standard IPv4 packets lack any place within the headers to embed metadata concerning the packet itself or the end-to-end flow that the packet is part of. Instead, passing metadata information from node to node within a network along a flow path requires the use of an overlay network, using technologies such as VXLAN. MPLS. VPN, or similar technologies that allow for an extension of the IP packet header, thus providing a location where such metadata can be embedded. While functional, the implementation of such technologies on a large scale can oftentimes be impractical and, in some scenarios, lacking metadata restricts a node's ability to handle traffic in more sophisticated ways.

This application is directed to techniques for passing frame metadata between network nodes (e.g., switches, routers, hosts, etc.) in Ethernet systems by utilizing an extension to Ethernet packet formatting to allow metadata exchange. For example, a preamble field of an Ethernet packet may be utilized to carry telemetry data. In some examples, a bit pattern may be embedded in a first portion of the preamble to indicate that a second portion of the preamble includes metadata. In this way, when a network node receives the Ethernet packet, the network node may determine, based on the bit pattern, that the preamble of the Ethernet packet includes the metadata. As such, rather than discarding the preamble data, the network node may preserve the preamble data, including the metadata, and make policy decisions for routing the Ethernet packet. The technologies disclosed herein allow network nodes connected by Ethernet links to communicate metadata on a point-to-point basis, with domain-wide or targeted-to-a-set-of-nodes metadata propagation, which, in some examples, may be driven by a controller or NMS system in conjunction with the nodes involved. Further, the metadata may be exchanged between the network nodes in a way that allows for a determination as to when the metadata can be used and understood between systems, nodes, and links, allowing for novel outcomes to be achieved via enhanced and rapid metadata processing at the physical level (e.g., PHY) in Ethernet systems, while retaining compliance and backwards-compatibility for systems that cannot use or understand such embedded metadata encoding. In some examples, the metadata embedding techniques may be under the supervision of a controller or network monitoring system (NMS) in a way that is rapid, lightweight, and not easily detectable by adversarial parties that may have access to the packet stream.

As noted above, the techniques described herein leverage the Ethernet preamble field for enabling the passing of metadata between network nodes. All Ethernet packets, when sent at Layer 1 between network nodes, employ a preamble mechanism. The purpose of the preamble is to signal to network nodes that a frame is about to arrive, and to allow both the sender and receiver to synchronize their bit-clocking for the link. In an Ethernet system, this preamble is usually 56-bits (7 bytes) consisting of alternating 1s and 0s, essentially signaling "packet coming" to the receiving node. The preamble is then followed by a start of frame delimiter (SFD), which is an 8-bit fixed, binary number "10101011." While bit times may vary based on Ethernet speeds, the same basic preamble and SFD structure is used across all Ethernet speed variants. The preamble has the benefit of allowing sender and receiver to align their bit boundaries, such that bytes may be recovered properly from the underlying bitstream. Normally, the preamble is used to align the sender and receiver, and then is discarded at the receiving PHY.

However, according to the techniques disclosed herein, the receiving PHY (which may be adapted/configured to perform the techniques disclosed herein) may be configured to refrain from discarding the preamble data if it is signaled that the preamble contains embedded metadata. Rather, the receiving PHY in such a case may buffer the incoming metadata, and signal to the node within which the PHY is embedded that such metadata exists, allowing it to be recovered from and associated with (e.g., but remain separate from) the frame with which it arrived. The basic Ethernet preamble dates back to the origins of Ethernet and, as such, may be intended to address restrictions which may no longer exist with today's (or tomorrow's) PHYs and chipsets. Specifically, modern Ethernet chipsets may or may not require such a long preamble in order to sync clocks and, as such, some of this preamble space may possibly be used for other purposes, such as carrying metadata as is described herein, assuming that the Ethernet PHY and associated chipsets in the associated nodes and links are configured and made aware of the existence of such metadata and are capable of using such metadata.

The techniques disclosed herein allow the optional embedding of metadata within the Ethernet preamble area, which exists in every transmitted Ethernet packet. By way of example, and not limitation, this may be done as follows, working backwards from the SFD:

Last byte including SFD to be transmitted as it is today (e.g., "10101011"), with the proceeding byte also transmitted as it is today (e.g., "10101010").

Thus, the total two bytes at the end of the preamble/ SFD may read as "1010101010101011." This thus includes 14 bits of alternating 1s and 0s, which is sufficient to allow the receiving PHY to sync clocks, along with the SFD bits to indicate the start of the frame. In various examples, more or less bits may be utilized and/or necessary for synchronization and the SFD.

The preceding (e.g., up to six) bytes of the Ethernet preamble may be used to optionally encode metadata on the link involved.

The presence of this metadata may be indicated by a unique bit pattern in the first byte of the preamble (e.g., 1-byte for metadata-signaling bit pattern, 5-bytes for metadata). The actual structure of the metadata, as well as its employment and use, may be implementation-specific, and could take a wide number of forms depending on the use cases involved.

As mentioned, in some examples, the first byte of the preamble may be set with a specific, implementation-specific bit pattern (e.g., one that is recognizable, but does not replicate the standard preamble bit pattern) to allow network nodes with knowledge of the preamble embedding to understand that the following bytes represent the embedded metadata. In some examples, network nodes without the ability to understand the embedded preamble metadata may possibly ignore and/or treat the restructured preamble as "noise." at least up to the point where the last 16-bits (or more/less) of the preamble and SFD are received, which allows network nodes to then sync clocks and bit boundaries to receive the standard Ethernet packet(s) that follow(s). However, negotiation of the embedded metadata capability and use between network nodes and on specific links may be required, as modification of the Ethernet preamble goes beyond the Ethernet standard, and appropriate operation of and with the embedded metadata encoded into the Ethernet preamble may not interoperate with other, non-embedded metadata-capable Ethernet nodes and links. In additional, or alternative, examples, the capabilities disclosed herein for carrying metadata in the Ethernet preamble may require new and/or reprogrammed PHYs, as the techniques disclosed provide an extension to the Ethernet preamble that is not covered in the Ethernet standard. As such, it may be important that the disclosed techniques be implemented in and between nodes that can encode, understand, process, and use the preamble-embedded metadata. In various examples, byte alignment for the embedded metadata within the preamble may be preserved by the actual alternating 1s and 0s preamble and SFD that follows it, allowing the receiving node to work backwards and recover the embedded metadata properly.

In examples, a controller or NMS system may be desirable, but not necessarily required, to implement this invention, as coordination of this capability across multiple network nodes may be required, along with the configuration necessary to define, propagate, and interpret the metadata application on the nodes involved. For instance, since not all nodes within a domain or across an end-to-end path may be able to leverage this metadata embedded in the preamble, the use of a controller or NMS system may be desirable to orchestrate which network nodes will embed the metadata, and which will not. In some scenarios, the controller/NMS system may be optimally positioned to do this, since the controller/NMS system has knowledge—not only of the network nodes within the domain and their various capabilities (e.g., to leverage this preamble metadata mechanism on a point-to-point basis, or not)—of application use(s) to which this metadata may be put and may, therefore, set up the resulting network system appropriately. For example, it may be desirable to only enable this link between a firewall and an attached switch or router such that a piece of metadata embedded by the firewall and relating to the "suspiciousness" level of the traffic involved could be used by the switch or router to direct that traffic into an alternate path (e.g., one that involves deeper scrutiny/DPI analysis) or which might trigger a copy of that traffic to be kept for later forensic examination. Likewise, in some examples, the embedded preamble metadata may be used to signal packets and/or frames which are of special significance (e.g., for debugging purposes) and which could be copied to a PCAP file—or copied/punted to a device control plane—for deeper or more detailed analytics and logging.

In some examples, such as in the event that it is desirable to propagate the metadata across multiple nodes within a network, the embedded preamble metadata may be cached by the network node, associated with the packet as it transits the node internally, and re-embedded on the transmitting interface, to be picked up by the next network node. In some examples, this may all be under the control and orchestration provided by the controller/NMS system. In some examples, link-layer protocols (e.g., CDP, LLDP-MED, or similar) may be used to negotiate between two adjacent network nodes as to whether or not the metadata-enabled preamble method could be used (e.g., to determine whether capable PHYs and appropriate device configurations on both ends of the link, or not). In the absence of such a positive assertion, standard Ethernet PHY behavior may be used. This capability for link-level inter-device signaling may be used in conjunction with an NMS, or without an NMS (although an NMS or similar controller may, of course, assist with scaling the solution across multiple devices).

The techniques disclosed herein offer several advantages in computer-related technology. For instance, the techniques leverage a standard Ethernet mechanism to send metadata between network nodes without requiring the use and complication of an overlay network such as VXLAN, MPLS, VPN, etc., and which can be implemented in a very targeted way such that the capability may be implemented only where it is needed/understood by the nodes involved. An additional, and important, advantage of embedding metadata in the preamble of Ethernet packets is that the embedded metadata, operating at the PHY layer (Layer 1), is normally invisible to most network management and analytics tools (e.g., packet sniffers, etc.) and, as such, operates in a "sub-rosa" mode that may be visible only to the node(s) involved. The techniques can thus be used to optionally communicate metadata between nodes in such a way that is not easily recovered or reviewed (e.g., by unauthorized parties), except by the network nodes themselves (which, by their nature, are typically more trusted entities). This capability thus provides a more secure/obscured way to pass packet metadata between nodes, which may be very useful in certain secure applications and environments. Furthermore, the techniques disclosed herein may apply to any Ethernet-transported protocols, including IPv4, IPv6, and any Ethernet-encapsulated data, thus enhancing its utility across different network environments and deployments, including both traditional and non-traditional deployment scenarios.

Furthermore, preamble-embedded metadata also has the advantage that, since it is received as the first incoming bits within a packet and at the physical level, it may be processed first and certain, critical traffic routing decisions within the node may be made on the basis of the embedded metadata. For example, the PHY may be programmed, by higher-level software within the node, with a bit pattern recognizer such that any Ethernet packet that arrived with a defined bit pattern in the preamble-embedded metadata was sent to specific process within the node, whereas any packet that arrived with a different, pre-defined preamble-embedded metadata (or with no preamble-embedded metadata at all) was sent to a different process inside the nod. That is, Ethernet packet preambles having different bit patterns may be processed differently (e.g., process "A" may be a more-secure process or one designed to handle frames so designated, process "B" may be designed to handle other frames, process "C" may be configured to handle standard frames, or the like). In such a way, the use of preamble-embedded metadata may be used to securely select incoming frames to the appropriate, compartmentalized secure processes within the receiving node, and may do so at the PHY level in a way that may not be easy for an attacker either to detect or to defeat. Doing this at the PHY level may not only be faster and more secure as a consequence, but it may also alleviate selected frame examination and process routing decisions within the node by that node's other hardware, enhancing performance and lowering overhead. Additional advantages in computer-related technology and networking will be readily apparent to those having ordinary skill in the art.

By way of example, and not limitation, a method according to the techniques disclosed herein may include receiving an Ethernet packet at a first network node. In some examples, the Ethernet packet may be sent from a second network node. In some examples, the Ethernet packet may be received at the first network node, and sent from the second network node, via an Ethernet link between the first network node and the second network node. In some examples, physical-layer component(s)(e.g., PHY transceiver) of the first network node and the second network node may perform the operations described above, such as receiving the Ethernet packet and sending the Ethernet packet. In some examples, the Ethernet link may be connected to the respective physical-layer component(s) of the first network node and the second network node.

In some examples, the method may include determining that a preamble of the Ethernet packet includes metadata. For example, a determination may be made that a first portion of the preamble includes a unique bit pattern associated with the preamble carrying metadata. That is, in some examples, the unique bit pattern may indicate that a second portion of the preamble includes the metadata. In some examples, different bit patterns may be used to indicate different types of metadata, different classes of traffic, different processes within a node for processing the Ethernet frame data, etc. In some examples, a size or length of the bit pattern/first portion of the preamble may vary depending on specific implementations. For instance, the size/length of the bit pattern may be any number of bits or bytes necessary to indicate that the preamble includes metadata, such as 4-bits. 5-bits. 6-bits. 7-bits. 1-byte, etc. In some examples, the determination that the preamble includes the metadata may be made at the physical level or layer of a node. For instance, the physical-layer component(s) of the first network node may determine that the preamble of the Ethernet packet includes the metadata.

In some examples, the method may include refraining from discarding the preamble (e.g., the data included in the preamble field) of the Ethernet packet based at least in part on determining that the preamble includes the metadata. For instance, the physical-layer component(s) may be configured to refrain from discarding the preamble data if it is signaled (e.g., by the unique bit pattern) that the preamble contains embedded metadata. Rather, the physical-layer component(s) in such a case may buffer the incoming metadata, and signal to the first network node that such metadata exists, allowing the metadata to be recovered from and associated with (e.g., but remain separate from) the Ethernet packet with which it arrived.

In some examples, the first portion of the preamble (e.g., including the bit pattern indicating the preamble contains metadata) and the second portion of the preamble (e.g., containing the metadata) may precede a third portion of the preamble. In examples, this third portion of the preamble may include a synchronization bit pattern (e.g., "101010 . . . ") which may precede the start of frame delimiter (SFD) byte/bit pattern (e.g., "10101011"). In examples, the third portion and the synchronization bit pattern may be varied in size/length depending on implementation. For instance, while the synchronization bit pattern may be described herein as being 1-byte, the synchronization bit pattern may be longer or shorter. In some examples, the synchronization bit pattern (or the third portion) may not be included in the packet preamble and receiving network nodes may be capable of relying on the SFD byte/bit pattern for synchronization.

In some examples, the method may include determining a policy decision based at least in part on the metadata. In some examples, the policy decision may be associated with handling the Ethernet packet. For example, the metadata may be associated with (e.g., related to, pertain to, etc.) the Ethernet packet itself. Additionally, or alternatively, the metadata may be associated with an end-to-end flow that the packet(s) belong to and/or is/are a part of. For example, the metadata may include, but not be limited to, data concerning tags for use in security and other applications (e.g., SGT), virtual network information, linkages to app-level transactions knowledge, traffic trustworthiness levels, and/or other capabilities. Accordingly, the metadata may be utilized by the first network node to make a policy decision for handling the Ethernet packet and/or the frame data therein, such as determining to pass, drop, punt, copy, redirect, log, etc. the Ethernet packet and/or the frame(s). As noted above, in some examples, the metadata and/or the bit pattern may be utilized by the physical-layer component(s) of the first node to determine a specific process within the network node to send the Ethernet packet and/or frame to.

In some examples, the method may include handling the Ethernet packet (or the frame data) based at least in part on the policy decision. That is, the Ethernet packet and/or the frame data may be handled in accordance with the policy decision. For instance, the Ethernet packet and/or the frame may be passed, dropped, punted, copied, redirected, logged, etc., sent to a specific process within the first network node, or the like.

In some examples, the first network node and/or the physical-layer component(s) may determine that the metadata is to be provided to a third network node. That is, a determination may be made that the metadata is to be propagated across multiple nodes within a network. In such examples, the first network node and/or the physical-layer component(s) may store the embedded preamble metadata in a cache memory associated with the first network node while the packet transits the first network node internally. Additionally, in such examples, the metadata may be re-embedded on the transmitting interface (e.g., in the preamble of another Ethernet packet) prior to being sent to the third network node such that the metadata may be picked up by the third network node.

Certain implementations and additional embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
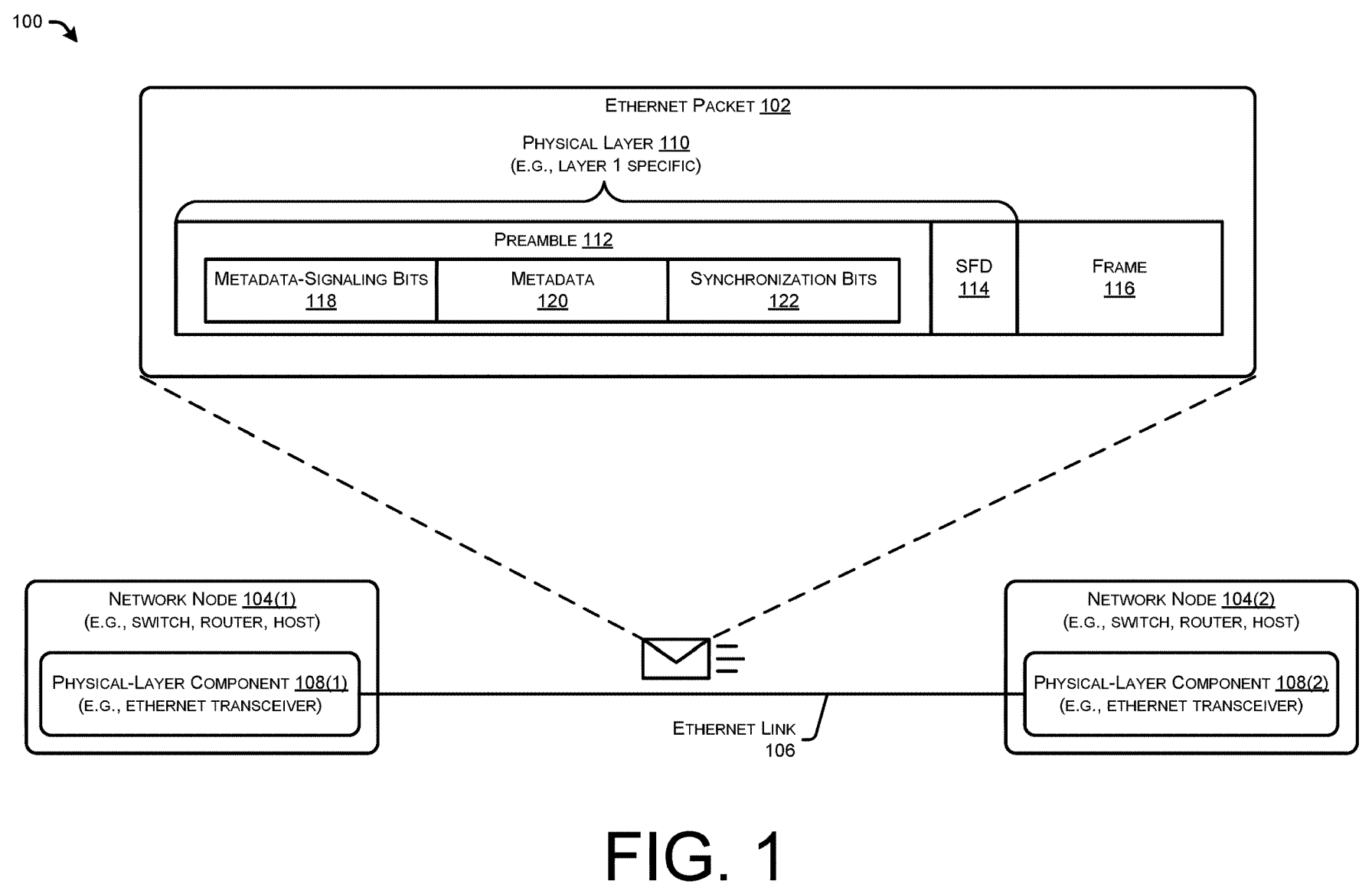

FIG. 1 illustrates a portion of an example architecture 100 in which various aspects of the techniques disclosed herein may be performed to embed metadata within an Ethernet packet 102. For instance, the portion of the architecture 100 includes a first network node 104(1) and a second network node 104(2), and the Ethernet packet 102 is being sent from the second network node 104(2) to the first network node 104(1) via an ethernet link 106 (e.g., a physical Ethernet link). The network nodes 104 may also include respective physical layer components 108(1) and 108(2), which may be ethernet transceivers (PHYs) or other components or devices.

Also illustrated in FIG. 1 is high-level detail of a physical layer 110 (e.g., layer 1 specific) of the Ethernet packet 102. Specific to the physical layer 110 (e.g., not included in layer 2) is a preamble 112 and an SFD 114 (start of frame delimiter). The Ethernet packet 102 also includes a frame 116, which is part of layer 2. The frame 116 may include, among other things, MAC addresses (e.g., MAC source, MAC destination), Ethertype, payload, frame check sequence, etc. The preamble 112 of the ethernet packet 102 includes metadata-signaling bits 118, metadata 120, and synchronization bits 122.

In some examples, when the Ethernet packet 102 is received at the first network node 104(1) from the second network node 104(2) via the Ethernet link 106, the first network node 104(1) and/or the physical-layer component 108(1)(e.g., PHY transceiver) may determine that the preamble 112 of the Ethernet packet 102 includes the metadata 120. For example, a determination may be made that the metadata-signaling bits 118 of the preamble 112 include a unique bit pattern associated with the preamble 112 carrying metadata 120. That is, in some examples, the unique bit pattern included in the metadata-signaling bits 118 may indicate that a second portion of the preamble 112 includes the metadata 120. In some examples, a size or length of the metadata-signaling bits 118, metadata 120, and synchronization bits 122 may vary depending on specific implementations. For instance, the size/length of the metadata-signaling bits 118 may be any number of bits or bytes necessary to indicate that the preamble 112 includes the metadata 120, such as 4-bits. 5-bits. 6-bits. 7-bits. 1-byte, etc. In some examples, the determination that the preamble 112 includes the metadata 120 may be made at the physical level of the first network node 104(1). For instance, the physical-layer component 108(1) of the first network node 104(1) may determine that the preamble 112 of the Ethernet packet 102 includes the metadata 120.

In some examples, the first network node 104(1) and/or the physical-layer component 108(1) may refrain from discarding the preamble 112 and its included data based at least in part on determining that the preamble 112 includes the metadata 120. For instance, the physical-layer component 108(1) may be configured to refrain from discarding the preamble 112 if it is signaled (e.g., by the metadata-signaling bits 118) that the preamble 112 contains the embedded metadata 120. Rather, the physical-layer component 108(1) in such a case may buffer the incoming metadata 120, and signal to the first network node 104(1) that the metadata 120 exists, allowing the metadata 120 to be recovered from and associated with (e.g., but remain separate from) the Ethernet frame 116 with which it arrived.

In examples, the size (e.g., number) of the synchronization bits 122 may be varied depending on implementation. For instance, while the synchronization bits 122 may be described herein as being 1-byte (e.g., 8-bits), the synchronization bits 122 may be longer or shorter. In some examples, the synchronization bits 122 may not be included in the packet preamble 112, and the first network node 104(1) and/or the physical-layer component 108(1) may be capable of relying on the SFD 114 alone for synchronization.

In some examples, the first network node 104(1) may make a policy decision based at least in part on the metadata 120. In some examples, the policy decision may be associated with handling the Ethernet packet 102. For example, the metadata 120 may be associated with (e.g., related to, pertain to, etc.) the Ethernet packet 102 itself and/or the frame 116. Additionally, or alternatively, the metadata 120 may be associated with an end-to-end flow that the Ethernet packet 102 belongs to and/or is a part of. For example, the metadata 120 may include, but not be limited to, data concerning tags for use in security and other applications (e.g., SGT), virtual network information, linkages to app-level transactions knowledge, traffic trustworthiness levels, and/or other capabilities. Accordingly, the metadata 120 may be utilized by the first network node 104(1) and/or the physical-layer component 108(1) to make a policy decision for handling the Ethernet packet 102 and/or the frame 116 data therein, such as determining to pass, drop, punt, copy, redirect, log, etc. the Ethernet packet 102 and/or the frame 116. As noted above, in some examples, the metadata 120 and/or the metadata-signaling bits 118 may be utilized by the physical-layer component 108(1) of the first network node 104(1) to determine a specific process within the first network node 104(1) to send the Ethernet packet 102 and/or frame 116 to.

In some examples, the first network node 104(1) and/or the physical-layer component 108(1) may determine that the metadata 120 is to be provided to a third network node. That is, a determination may be made that the metadata 120 is to be propagated across multiple nodes within a network. In such examples, the first network node 104(1) and/or the physical-layer component 108(1) may store the embedded preamble 112 metadata 120 in a cache memory associated with the first network node 104(1) while the packet 102 transits the first network node 104(1) internally. Additionally, in such examples, the metadata 120 may be re-embedded on the transmitting interface (e.g., in the preamble of another Ethernet packet) prior to being sent to the third network node such that the metadata 120 may be picked up by the third network node.

FIG. 2A is a block diagram illustrating example detail of an exemplary physical layer 110 of an Ethernet packet, such as the Ethernet packet 102, that is modified to carry metadata 120 according to the technologies disclosed herein. The physical layer 110 of the Ethernet packet includes the preamble 112 and the SFD 114. The preamble 112 itself includes the metadata-signaling bits 118, the metadata 120, and the synchronization bits 122.

According to the various examples described herein, the SFD 114 may be 1-byte in length and transmitted as it is today (e.g., "10101011"). In some examples, the synchronization bits 122 may precede the SFD 114. The synchronization bits 122 may, in some examples, be 1-byte in length (e.g., 8-bits) and transmitted as they are today (e.g., "10101010"). Thus, the synchronization bits 122 and the SFD 114, which together may total two bytes at the end of the preamble/SFD, may read as "1010101010101011." This thus includes 14 bits of alternating 1s and 0s, which may be sufficient (e.g., or more than sufficient, in some instances) to allow the receiving PHY to sync clocks, along with the SFD 114 bits to indicate the start of the frame. In various examples, more or less bits may be utilized and/or necessary for synchronization and the SFD 114.

The preceding (e.g., up to six) bytes of the Ethernet preamble 112 may be used for the metadata-signaling bits 118 and the metadata 120. The presence of the metadata 120 may be indicated by a unique bit pattern in the metadata-signaling bits 118. The actual structure of the metadata 120, as well as its employment and use, may be implementation-specific, and could take a wide number of forms depending on the use cases involved.

FIG. 2B illustrates a comparison between a traditional physical layer 200 of an Ethernet packet and a modified physical layer 210 of an Ethernet packet for carrying metadata according to the technologies disclosed herein.

As shown, the traditional physical layer 200 includes preamble bytes 202 and an SFD byte 204. The preamble bytes 202 includes bits of alternating 1s and 0s to synchronize bit clocks, and the SFD byte 204 includes a continuation of the alternating 1s and 0s, but ends with two consecutive bits of 1 (e.g., "11"). In comparison, the modified physical layer 210 includes a metadata-signaling byte 212 (e.g., for signaling that a packet includes metadata), metadata-carrying bytes 214 (e.g., to carry/embed the metadata), a sync byte 216 (e.g., for synchronizing sender and receiver bit clocks), and the SFD byte 204.

It is to be appreciated that other configurations for a modified physical layer 210 are possible, and that the techniques disclosed herein are not to be limited to the specific example shown in FIG. 2B. For instance, as noted above, the sync byte 216 may be removed in some scenarios where the extra synchronization bits may not be necessary. Further, the metadata-signaling byte 212 may be less than 1-byte of data, in some implementations. Even further, the example binary bits illustrated in FIG. 2B for the metadata-signaling byte 212 and the metadata-carrying bytes 214 may be different and are not limited to the combination of bits shown in FIG. 2B.

FIGS. 3 and 4 are flow diagrams illustrating example methods 300 and 400 associated with the techniques described herein. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 3 and 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 is a flow diagram illustrating an example method 300 associated with the techniques described herein. The method 300 begins at operation 302, which includes receiving, at a first network node, an ethernet packet sent by a second network node via an ethernet link between the first network node and the second network node. For instance, the first network node 104(1) or the physical-layer component 108(1) of the first network node 104(1) may receive the ethernet packet 102 sent by the second network node 104 (2)(or the physical-layer component 108(2)) via the ethernet link 106.

At operation 304, the method 300 includes determining that a preamble of the Ethernet packet includes metadata. For instance, the first network node 104(1) or the physical-layer component 108(1) of the first network node 104(1) may determine that the preamble 112 of the Ethernet packet 102 includes the metadata 120. In examples, the first network node 104(1) or the physical-layer component 108(1) may determine that the preamble 112 includes the metadata 120 based at least in part on metadata-signaling bits 118 included in the preamble 112.

At operation 306, the method 300 includes determining, based at least in part on the metadata, a policy decision associated with handling the ethernet packet. For instance, the first network node 104(1) or the physical-layer component 108(1) of the first network node 104(1) may determine the policy decision associated with handling the ethernet packet 102. In some examples, the policy decision may be a decision by the physical-layer component 108(1) to send the Ethernet packet 102 and/or the frame 116 to a specific process within the first network node 104(1). Additionally, or alternatively, the policy decision may include the first network node 104(1) determining to drop, punt, copy, redirect, forward, etc. the ethernet packet 102 and/or the frame 116.

At operation 308, the method 300 includes handling the Ethernet packet based at least in part on the policy decision. For instance, the first network node 104(1) or the physical-layer component 108(1) of the first network node 104(1) may handle the Ethernet packet 102 based at least in part on the policy decision. In examples, handling the Ethernet packet 102 based at least in part on the policy decision may include sending, by the physical-layer component 108(1), the Ethernet packet 102 and/or the frame 116 to a specific process within the first network node 104(1). Additionally, or alternatively, handling the Ethernet packet 102 based at least in part on the policy decision may include passing, dropping, punting, copying, redirecting, logging, etc., by the first network node 104(1), the Ethernet packet 102 and/or the frame 116.

FIG. 4 is a flow diagram illustrating an example method 400 associated with the techniques described herein. The method 400 begins at operation 402, which includes receiving, at a network node, an Ethernet packet sent by another network node via an Ethernet link between the network node and the other network node. For instance, the physical-layer component 108(1) of the first network node 104(1) may receive the Ethernet packet 102 sent by the second network node 104(2) via the Ethernet link 106, At operation 404, the method 400 includes determining, based at least in part on a bit pattern included in a first portion of a preamble of the Ethernet packet, that a second portion of the preamble includes metadata. For instance, the physical-layer component 108(1) of the first network node 104(1) may determine, based at least in part on the metadata-signaling bits 118 included in the preamble 112 of the Ethernet packet 102, that the preamble 112 includes the metadata 120.

At operation 406, the method 400 includes based at least in part on the metadata, causing the Ethernet packet or a frame within the Ethernet packet to be processed within the network node using a first processing algorithm that is distinguishable from a second processing algorithm. For instance, the physical-layer component 108(1) of the first network node 104(1) may cause the Ethernet packet 102 or the frame 116 to be processed within the first network node 104(1) using the first processing algorithm.

FIG. 5 illustrates a block diagram illustrating an example packet switching device 500 (or packet switching system) that can be utilized to implement various aspects of the technologies disclosed herein. In some examples, packet switching device(s) 500 may be employed in various networks and architectures, such as, for example, the architecture 100 described with respect to FIG. 1. For instance, the network nodes 104 in FIG. 1 may include similar components as the packet switching device 500.

In some examples, the packet switching device 500 may comprise multiple line card(s) 502, 510, each with one or more network interfaces for sending and receiving packets over communications links (e.g., possibly part of a link aggregation group). The packet switching device 500 may also have a control plane with one or more route processor 504 elements for managing the control plane and/or control plane processing of packets associated with forwarding of packets in a network, including, but not limited to, exchanging routing information, creating routing information base(s)(RIBs), and/or populating forward information base (s)(FIBs) on LCs. The packet switching device 500 may also include other cards 508 (e.g., service cards, blades) which include processing elements that are used to process (e.g., forward/send, drop, manipulate, change, modify, receive, create, duplicate, apply a service) packets associated with forwarding of packets in a network. The packet switching device 500 may comprise hardware-based communication mechanism 506 (e.g., bus, switching fabric, and/or matrix, etc.) for allowing its different entities to communicate. Line card(s) 502, 510 may typically perform the actions of being both an ingress and/or an egress line card 502, 510, in regard to multiple other particular packets and/or packet streams being received by, or sent from, packet switching device 500.

Figure 6:
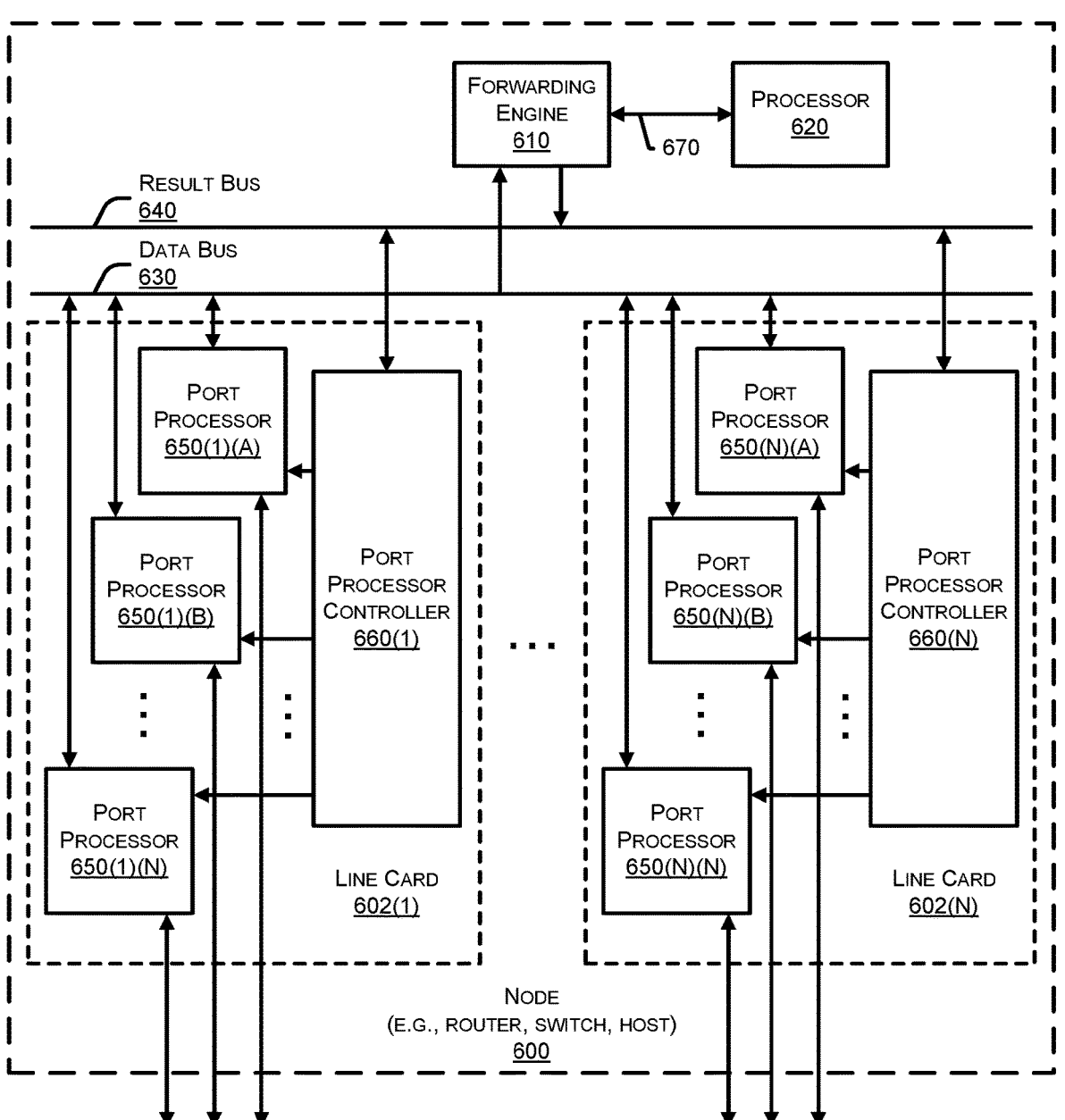
FIG. 6 is a block diagram illustrating certain components of an example node that can be utilized to implement various aspects of the technologies disclosed herein.

FIG. 6 illustrates a block diagram illustrating certain components of an example node 600 that can be utilized to implement various aspects of the technologies disclosed herein. In some examples, node(s) 600 may be employed in various architectures and networks, such as, for example, the architecture 100 described with respect to FIG. 1.

In some examples, the node 600 may include any number of line cards 602 (e.g., line cards 602(1)-(N), where N may be any integer greater than 1) that are communicatively coupled to a forwarding engine 610 (also referred to as a packet forwarder) and/or a processor 620 via a data bus 630 and/or a result bus 640. Line cards 602(1)-(N) may include any number of port processors 650(1)(A)-(N)(N) which are controlled by port processor controllers 660(1)-(N), where N may be any integer greater than 1. Additionally, or alternatively, forwarding engine 610 and/or processor 620 are not only coupled to one another via the data bus 630 and the result bus 640, but may also communicatively coupled to one another by a communications link 670.

The processors (e.g., the port processor(s) 650 and/or the port processor controller(s) 660) of each line card 602 may be mounted on a single printed circuit board. When a packet or packet and header are received, the packet or packet and header may be identified and analyzed by node 600 (also referred to herein as a router) in the following manner. Upon receipt, a packet (or some or all of its control information) or packet and header may be sent from one of port processor(s) 650(1)(A)-(N)(N) at which the packet or packet and header was received and to one or more of those devices coupled to the data bus 630 (e.g., others of the port processor(s) 650(1)(A)-(N)(N), the forwarding engine 610 and/or the processor 620). Handling of the packet or packet and header may be determined, for example, by the forwarding engine 610. For example, the forwarding engine 610 may determine that the packet or packet and header should be forwarded to one or more of port processors 650(1)(A)-(N) (N). This may be accomplished by indicating to correspond- ing one(s) of port processor controllers 660(1)-(N) that the copy of the packet or packet and header held in the given one(s) of port processor(s) 650(1)(A)-(N)(N) should be forwarded to the appropriate one of port processor(s) 650 (1)(A)-(N)(N). Additionally, or alternatively, once a packet or packet and header has been identified for processing, the forwarding engine 610, the processor 620, and/or the like may be used to process the packet or packet and header in some manner and/or maty add packet security information in order to secure the packet. On a node 600 sourcing such a packet or packet and header, this processing may include, for example, encryption of some or all of the packet's and/or header's information, the addition of a digital signature, and/or some other information and/or processing capable of securing the packet or packet and header. On a node 600 receiving such a processed packet or packet and header, the corresponding process may be performed to recover or validate the packet's and/or header's information that has been secured.

Figure 7:
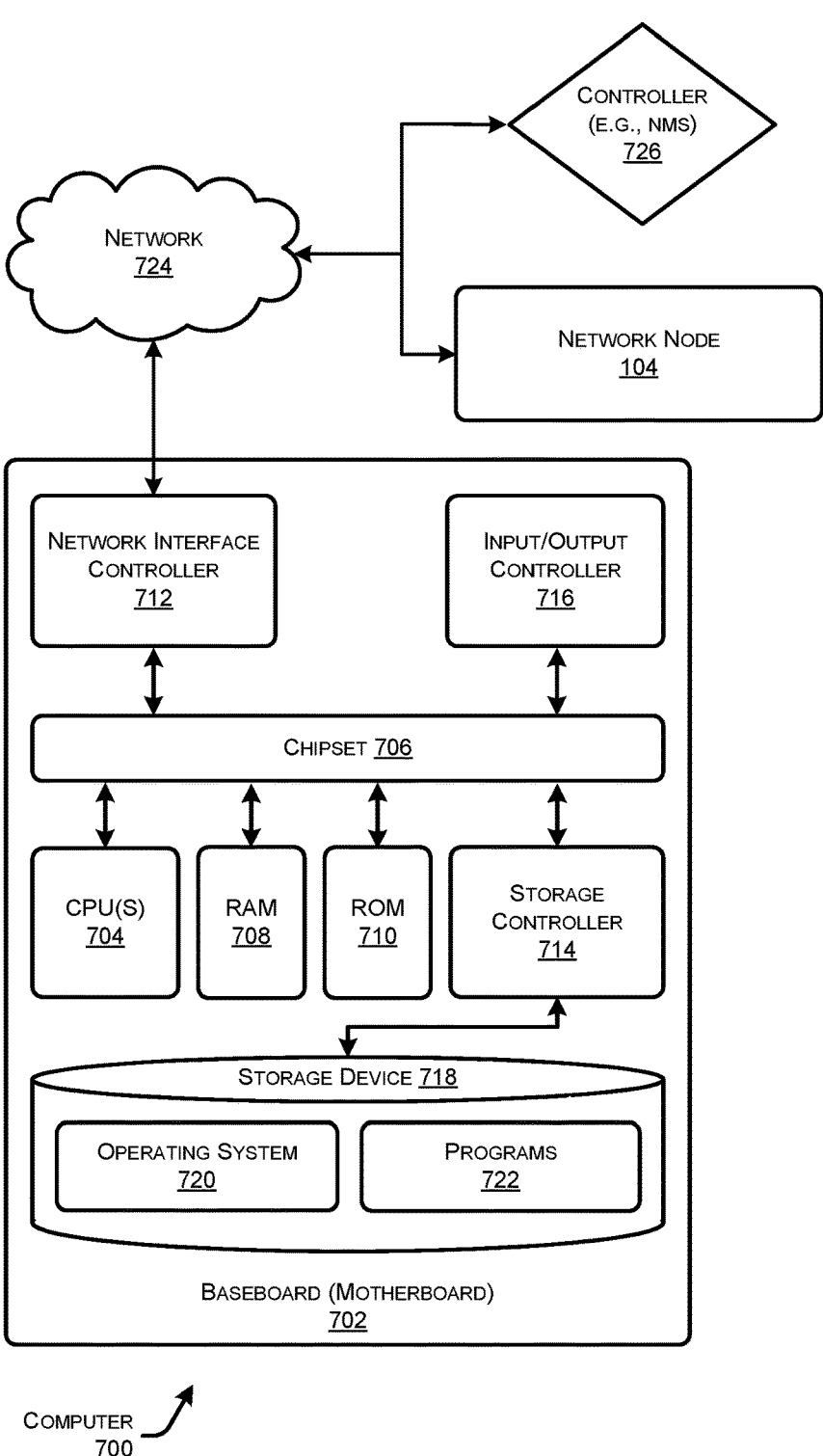
FIG. 7 is a computer architecture diagram showing an illustrative computer hardware architecture for implementing a computing device that can be utilized to implement aspects of the various technologies presented herein.

FIG. 7 is a computer architecture diagram showing an illustrative computer hardware architecture for implement- ing a computing device that can be utilized to implement aspects of the various technologies presented herein. The computer architecture shown in FIG. 7 may be illustrative of a conventional server computer, network node 104, router, switch, workstation, desktop computer, laptop, tablet, net- work appliance, e-reader, smartphone, load balancer, or other computing device, and can be utilized to execute any of the software components presented herein.

The computer 700) includes a baseboard 702, or "moth- erboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipu- lation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders- subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various com- ponents and devices. The ROM 710 or NVRAM can also store other software components necessary for the operation of the computer 700 in accordance with the configurations described herein.

The computer 700 can operate in a networked environ- ment using logical connections to remote computing devices and computer systems through a network. The chipset 706 can include functionality for providing network connectivity through a NIC 712, such as a gigabit Ethernet adapter. The NIC 712 is capable of connecting the computer 700 to other computing devices over the network 724, such as a control- ler 726 (e.g., NMS) and/or the network node 104. It should be appreciated that multiple NICs 712 can be present in the computer 700, connecting the computer to other types of networks and remote computer systems. In some examples, the NIC 712 may be configured to perform at least some of the techniques described herein.

The computer 700 can be connected to a storage device 718 that provides non-volatile storage for the computer. The storage device 718 can store an operating system 720, programs 722, and data, which have been described in greater detail herein. The storage device 718 can be con- nected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between com- puters and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physi- cal media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer- readable storage media to store and retrieve information, such as program modules, data structures, or other data. It should be appreciated by those skilled in the art that com- puter-readable storage media is any available media that provides for the non-transitory storage of data and that can be accessed by the computer 700. In some examples, the operations performed by the architecture 100 and or any components included therein, may be supported by one or more devices similar to computer 700. Stated otherwise, some or all of the operations performed by the architecture 100, and or any components included therein, may be performed by one or more computer devices 700 operating in a scalable arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes and functionality described above with regard to FIGS. 1-4, and herein. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

The computer 700 may include one or more hardware processors (processors) configured to execute one or more stored instructions. The processor(s) may comprise one or more cores. Further, the computer 700 may include one or more network interfaces configured to provide communications between the computer 700 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for embedding metadata in network traffic (e.g., IPv4 Ethernet traffic) without having to implement an overlay network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least partially by a first network node, the method comprising:
   receiving an Ethernet packet sent by a second network node via an Ethernet link between the first network node and the second network node;
   determining that a preamble of the Ethernet packet includes metadata by:
      determining that a first portion of the preamble includes a bit pattern indicating that a second portion of the preamble includes the metadata;
   determining, based at least in part on the metadata, a policy decision associated with handling the Ethernet packet; and
   handling the Ethernet packet based at least in part on the policy decision.

2. The method of claim 1, wherein the first portion of the preamble and the second portion of the preamble precede a third portion of the preamble, the third portion of the preamble including a synchronization bit pattern.

3. The method of claim 1, further comprising refraining from discarding the preamble of the Ethernet packet based at least in part on determining that the preamble includes the metadata.

4. The method of claim 1, wherein the bit pattern is a first bit pattern, the method further comprising determining, based at least in part on a second bit pattern included in the preamble, a first process within the first network node for handling the Ethernet packet.

5. The method of claim 4, wherein the second bit pattern is distinguishable from a third bit pattern, the third bit pattern indicative of a second process within the first network node for handling Ethernet packets, the second process distinguishable from the first process.

6. The method of claim 1, further comprising:
   determining that the metadata is to be provided to a third network node;
   storing, in a cache memory, the metadata while the Ethernet packet internally transits the first network node; and
   embedding the metadata in the preamble of another Ethernet packet prior to sending the other Ethernet packet to the third network node.

7. The method of claim 1, wherein the metadata is associated with at least one of the Ethernet packet itself or a flow that the Ethernet packet belongs to.

8. A system associated with a first network node, the system comprising:

one or more processors; and one or more non-transitory computer-readable media storing instructions that, when executed, cause the one or more processors to perform operations comprising:

receiving an Ethernet packet sent by a second network node via an Ethernet link between the first network node and the second network node;

determining that a preamble of the Ethernet packet includes metadata by:

determining that a first portion of the preamble includes a bit pattern indicating that a second portion of the preamble includes the metadata;

determining, based at least in part on the metadata, a policy decision associated with handling the Ethernet packet; and handling the Ethernet packet based at least in part on the policy decision.

9. The system of claim 8, wherein the first portion of the preamble and the second portion of the preamble precede a third portion of the preamble, the third portion of the preamble including a synchronization bit pattern.

10. The system of claim 8, the operations further comprising refraining from discarding the preamble of the Ethernet packet based at least in part on determining that the preamble includes the metadata.

11. The system of claim 8, wherein the bit pattern is a first bit pattern, the operations further comprising determining, based at least in part on a second bit pattern included in the preamble, a first process within the first network node for handling the Ethernet packet.

12. The system of claim 11, wherein the second bit pattern is distinguishable from a third bit pattern, the third bit pattern indicative of a second process within the first network node for handling Ethernet packets, the second process distinguishable from the first process.

13. The system of claim 8, the operations further comprising:

determining that the metadata is to be provided to a third network node;

storing, in a cache memory, the metadata while the Ethernet packet internally transits the first network node; and embedding the metadata in the preamble of another Ethernet packet prior to sending the other Ethernet packet to the third network node.

14. The system of claim 8, wherein the metadata is associated with at least one of the Ethernet packet itself or a flow that the Ethernet packet belongs to.

15. A network node including a physical layer (PHY) transceiver that is configured to perform operations comprising:

receiving an Ethernet packet sent by another network node via an Ethernet link between the network node and the other network node;

determining, based at least in part on a bit pattern included in a first portion of a preamble of the Ethernet packet, that a second portion of the preamble includes metadata; and based at least in part on the metadata, causing the Ethernet packet to be processed within the network node using a first processing algorithm that is distinguishable from a second processing algorithm.

16. The network node of claim 15, wherein the first portion of the preamble and the second portion of the preamble precede a third portion of the preamble, the third portion of the preamble including a synchronization bit pattern.

17. The network node of claim 15, wherein the metadata is associated with at least one of the Ethernet packet itself or a flow the Ethernet packet belongs to.

18. The network node of claim 15, the operations further comprising refraining from discarding the preamble of the Ethernet packet based at least in part on the preamble including the metadata.

19. The method of claim 1, further comprising:

determining, based on the first portion of the preamble, a type of the metadata included in the second portion of the preamble.

20. The system of claim 8, wherein a length of the bit pattern is 4-bits, 5-bits, 6-bits, 7-bits, or 1-byte.

\* \* \* \* \*